No. 835,876. PATENTED NOV. 13, 1906.
A. M. ANDERSEN.
COOKING UTENSIL.
APPLICATION FILED JULY 21, 1905.
2 SHEETS—SHEET 1.
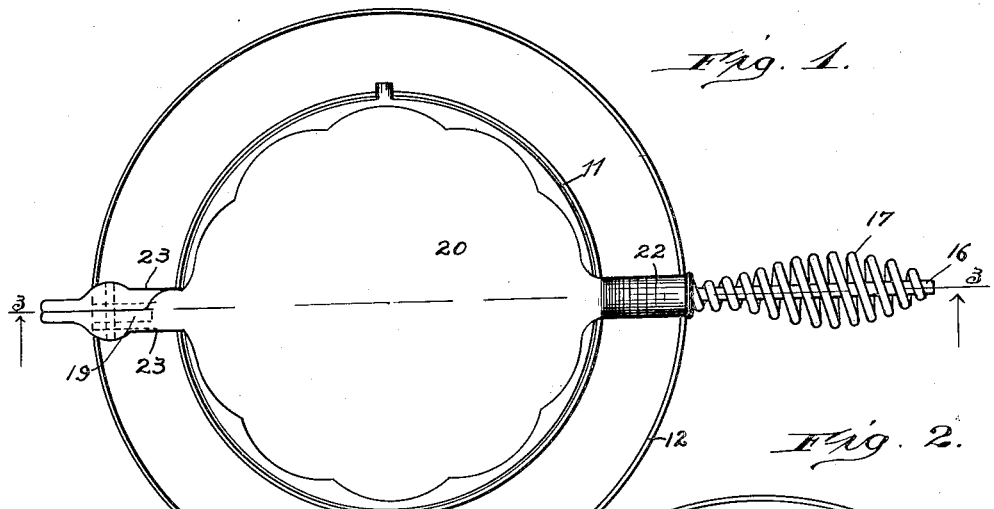
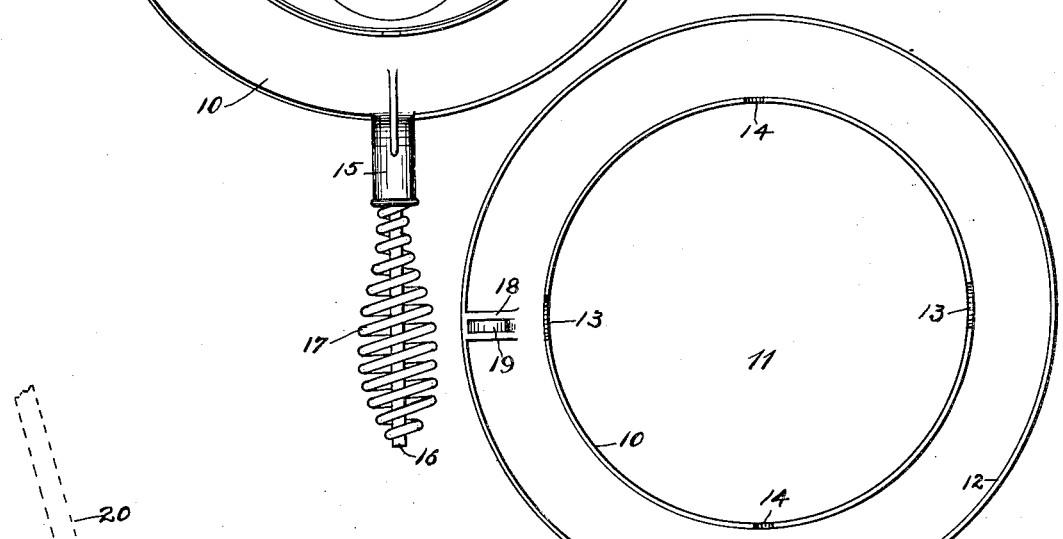
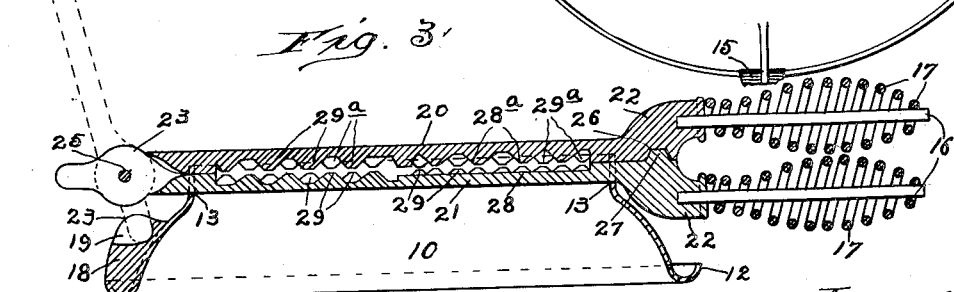
Witnesses:
Chas. E. Gorton.
N. A. Nyman.
Inventor:
Andrew M. Andersen.
By Chas. C. Tillman
Atty.

No. 835,876. PATENTED NOV. 13, 1906.
A. M. ANDERSEN.
COOKING UTENSIL.
APPLICATION FILED JULY 21, 1905.
2 SHEETS—SHEET 2.
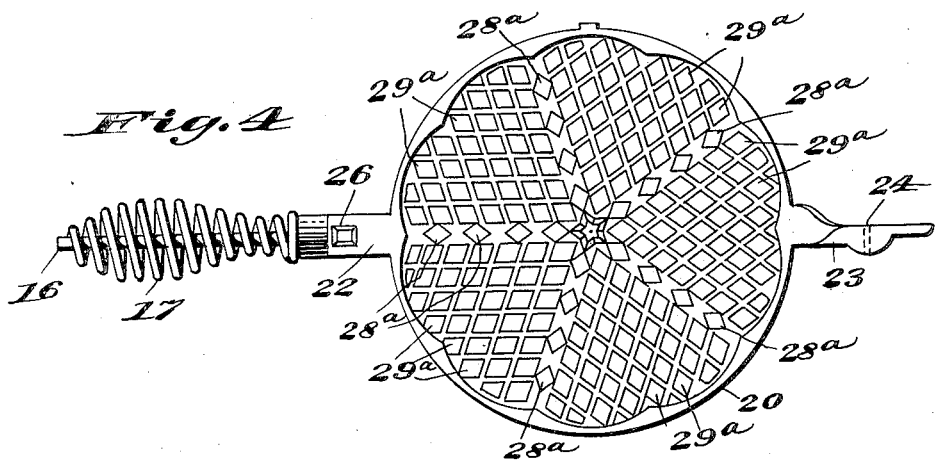
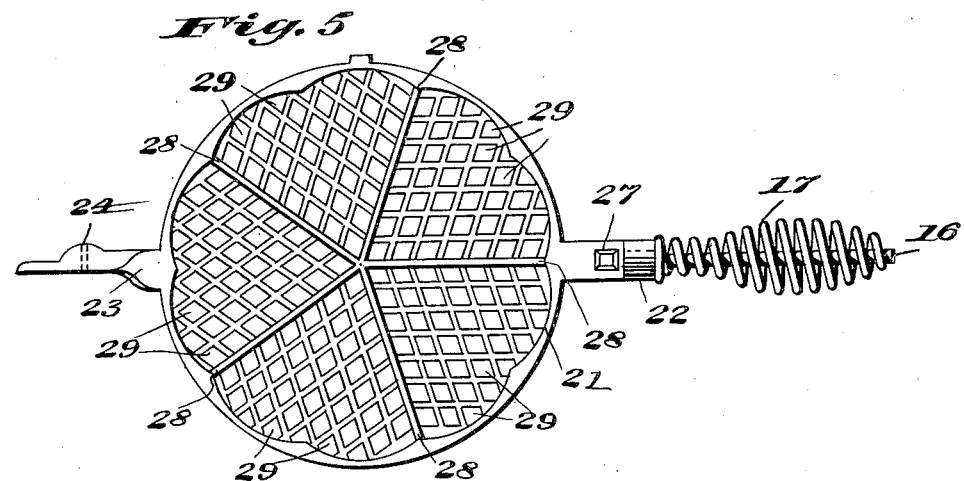
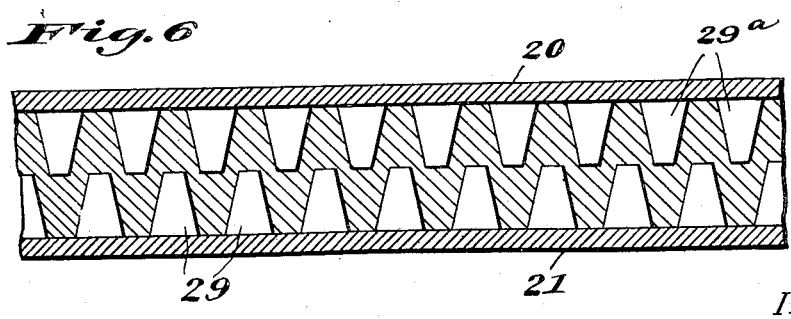
WITNESSES:
INVENTOR
Andrew M. Andersen.
By Chas. C. Tillman
Attorney

UNITED STATES PATENT OFFICE.

ANDREW M. ANDERSEN, OF CHICAGO, ILLINOIS.

COOKING UTENSIL.

No. 835,876.  Specification of Letters Patent.  Patented Nov. 13, 1906.

Application filed July 21, 1905. Serial No. 270,599.

*To all whom it may concern:*

Be it known that I, ANDREW M. ANDERSEN, a citizen of the United States, residing at Chicago, in the county of Cook and State of Illinois, have invented certain new and useful Improvements in Cooking Utensils, of which the following is a specification.

This invention relates to improvements in that type of cooking utensils known as "waffle-irons"—that is, such utensils as are employed for baking batter or thin cakes; and it consists in certain peculiarities of the construction, novel arrangement, and operation of the various parts thereof as will be hereinafter more fully set forth and specifically claimed.

The principal object of the invention is to provide a cooking utensil which shall be simple and inexpensive in construction, strong, durable, and efficient in operation, and so made that when the parts are in position for use the batter or dough will be pressed into thin cakes or portions, so that the operation of cooking may be hastened and will be more thoroughly performed than by such utensils of the old or common construction.

Another object of the invention is to furnish non-heat-conducting handles for the different members of the utensil.

A still further object is to provide means for securing the hinged members of the utensil together and for holding one of said members in an upright position when so desired.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a plan view of a cooking utensil embodying one form of my invention. Fig. 2 is a similar view of the base thereof, showing the handle of the same broken off. Fig. 3 is a transverse sectional view taken on line 3 3 of Fig. 1 looking in the direction indicated by the arrows. Fig. 4 is an inner face view of one of the hinged members of the utensil. Fig. 5 is a similar view of the other hinged member. Fig. 6 is an enlarged longitudinal sectional view of a part of the two members in the closed position, illustrating the manner in which the batter or dough is shaped by the arrangement of teeth on the sections.

Like numerals of reference refer to corresponding parts throughout the different views of the drawings.

The reference-numeral 10 designates the base of the utensil and, as shown, is circular in form and has a central opening 11 for the reception and operation of the hinged or baking members. The base 10 is flaring toward its bottom and has on its lower rim an upturned external flange 12, while its upper rim is provided with downwardly-curved recesses 13 and 14, which are arranged in pairs diametrically opposite each other, as is clearly shown in Fig. 2 of the drawings. Near one of the recesses 14 the base 10 is formed with an outwardly-extending projection 15, in which is secured a rod 16, around which is coiled a stiff wire 17, which is contracted at each of its ends, so as to clamp the rod 16, yet to hold the main portion of the wire 17 from said rod, thus preventing the wire becoming heated to an uncomfortable degree. Near one of the recesses 13 the base is provided on its outer surface with a lug 18, which is formed in its upper portion with a recess 19 for the purpose to be presently explained.

The reference-numerals 20 and 21 designate the baking or hinged members which are externally counterparts of one another, but differ in their construction on the inner faces. Each of the members 20 and 21 is provided with an outwardly-extending projection 22, in which is secured a rod 16 around which is coiled a stiff wire 17 of the same construction and for the same purpose as that shown on the base of the utensil and above described. Diametrically opposite the projection 22 each of the hinged members is provided with an extension 23, having a transverse opening 24 to receive a bolt 25, used for pivotally securing the extensions 23 on the hinged pieces together. When in their closed positions, as shown in Fig. 3 of the drawings, the projections 22 and extensions 23 on the hinged members will form an axle upon which said members may be turned within in the central opening of the base 10, as will be clearly understood by reference to Figs. 1 and 3 of the drawings, from which views it will also be seen and understood that the recesses 13 in the upper rim of the base will provide bearings for said projections and extensions. Each of the extensions 23 is formed adjacent to the edge of its member with a slight spiral shape or twist, while its outer portion is flattened on one of its surfaces and rounded on its outer surface, so that when said members are bolted together and the hinged members are closed they, the extensions, will form substantially a cylindrical stub-shaft. When one of the hinged members is raised to the position indicated by dotted lines in Fig. 3 of the drawings, the outer end of its extension 23 will engage the recess 19 of the lug 18 on the base and hold said member in its elevated position. One of the hinged members is provided on the surface of its projection 22 adjacent to the projection on the other hinged member with a recess 26 to receive a lug 27 on the projection 22 of the other member, which lug and recess serve to hold the hinged members together against lateral movement. One of the hinged members, usually the one indicated by the reference-numeral 21, is provided on its inner face with a recess which is practically as large as the member itself, or, in other words, extends nearly to its periphery and has therein a series of radial ribs 28, which divide said recess of the member into a series of compartments in each of which compartments are arranged in rows a series of teeth 29, tapered toward their free ends, and which terminate a slight distance below the horizontal plane of the peripheral face of said member when it occupies a horizontal position. The teeth 29 are therefore by the disposition and arrangement of the radial ribs 28 substantially divided or separated into groups, the said groups of teeth and the radially-disposed ribs coacting with the teeth of the member 20 in a specific manner, as will hereinafter more fully appear, for the accomplishment of an improved and advantageous result when using my improved waffle-iron. The other hinged member, usually the one indicated by the reference-numeral 20, is provided on its inner face with a recess of the same character as the recess in the member 21, and has therein a series of teeth 28$^a$, which terminate a slight distance below the horizontal plane of the peripheral face of said member when it occupies a horizontal position. These teeth 28$^a$ are arranged in radial rows, and when the members 20 21 are closed the said teeth 28$^a$ register with or, in other words, lie directly opposite to the ribs 28 in the member 21. The member 20 is also provided with a series of teeth 29$^a$, which, like the teeth 29 and teeth 28$^a$, terminate a slight distance below the horizontal plane of the peripheral face of the member 20, when it occupies a horizontal position. These teeth 29$^a$ are adapted to lie directly above the valleys or indentations between the teeth 29 on the hinged member 21, or, in other words, the teeth 29 and the teeth 29$^a$ are so disposed or arranged on the respective members that when the said members are in the closed position the teeth of one member are staggered with respect to the teeth of the other member. The radial rows of teeth 28$^a$ in the member 20 divide or separate the teeth 29$^a$ into groups of the same configuration as the groups of teeth 29 in the member 21. The teeth 29$^a$ on the member 20 are, like the teeth 29 on the member 21, tapered toward their free ends which ends extend almost to a horizontal plane on the peripheral face of the member 20 when it is in a horizontal position or closed on the other member.

The construction of the hinged members or plates 20 and 21 and the arrangement of the respective teeth and ribs on the inner surfaces of said members, as described above, are such that when the said members are brought together, as shown in Fig. 3, there will be but slight spaces between the projecting teeth of each member, thus forming the batter or dough on each of its surfaces with indentations alternately disposed or staggered with respect to one another, so that the cooking will be facilitated and more thoroughly than ordinarily.

By the specific arrangement of the teeth and ribs in one member with relation to the teeth in the other member, as described above, it will be observed that each side of the cake or dough will be formed with indentations of approximately the same depth, and that the inner ends of said indentations or depressions will reach to a plane drawn horizontally through the middle of the cake or dough, and that the depressions formed by the radial ribs 28 and the radially-arranged teeth 28$^a$ will indicate the points at which the cake may be divided into segmental pieces.

Having thus fully described my invention, what I claim as new, and desire to secure by Letters Patent, is—

1. A cooking utensil embodying two circular members pivotally secured together and each having its inner face provided with a recess, one of said members provided in its recess with groups of teeth of less height than the walls of the recess and the groups separated by radial ribs, also of less height than the walls of the recess, the other of said members having groups of teeth in its recess of less height than the walls of the recess and divided by radially-extending rows of teeth, the said groups of teeth in said members being disposed so that when the members are closed the groups of teeth in one member lie opposite the indentations between the teeth in the other member and the radially-extending rows of teeth in one member lie opposite the radial ribs in the other member.

2. A cooking utensil embodying two circular members pivotally secured together and each having its inner face provided with a recess, one of said members provided in its recess with groups of teeth of less height than the walls of the recess, radial ribs separating said groups of teeth and being of less height than the walls of the recess, groups of teeth arranged in the recess of the other of said members and of less height than the walls of the recess, radially-extending rows of teeth separating the groups of teeth in the last-named member, all of said teeth being tapered toward their free ends, and the said groups of teeth in one member so disposed that when the members are closed said teeth will lie opposite the indentations between the groups of teeth in the other member, and said radial ribs and radially-extending rows of teeth being so disposed on the respective members as to lie directly opposite each other when the members are closed.

3. A cooking utensil embodying two members pivotally secured together, and each having its inner face provided with a recess, one of said members provided in its recess with a plurality of teeth tapered toward their free ends and of less height than the walls of said recess, radially-extending ribs within the recess of said member separating said teeth into groups, the other of said members having teeth in its recess tapered toward their free ends and of less height than the walls of the recess, radially-extending rows of teeth in said second-named member dividing the first-named teeth thereof into groups corresponding in configuration to the groups of teeth in the first-named member, the said groups of teeth in one member so disposed with relation to the groups of teeth in the other member that when the members are closed the teeth in the matching groups of the members will be staggered with respect to each other and said radially-disposed ribs and radially-disposed rows of teeth of the respective members being so disposed on the members that when the latter are closed the said rows of teeth will lie directly opposite said radially-disposed ribs.

ANDREW M. ANDERSEN.

Witnesses:
M. A. NYMAN,
CHAS. C. TILLMAN.